United States Patent
Meier et al.

(10) Patent No.: US 8,402,248 B2
(45) Date of Patent: Mar. 19, 2013

(54) EXPLICITLY REGIONED MEMORY ORGANIZATION IN A NETWORK ELEMENT

(75) Inventors: Stephan Meier, Sunnyvale, CA (US); Robert Hathaway, Sunnyvale, CA (US); Evan Gewirtz, San Ramon, CA (US); Brian Alleyne, Los Gatos, CA (US); Edward Ho, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 289 days.

(21) Appl. No.: 12/983,130

(22) Filed: Dec. 31, 2010

(65) Prior Publication Data

US 2012/0173841 A1 Jul. 5, 2012

(51) Int. Cl.
*G06F 12/10* (2006.01)
(52) U.S. Cl. ........................... 711/206; 711/202
(58) Field of Classification Search .................. None
See application file for complete search history.

(56) References Cited

U.S. PATENT DOCUMENTS 7,685,254 B2 * 3/2010 Pandya ........................ 709/217
2009/0259816 A1 * 10/2009 Sharma et al. ................ 711/162

* cited by examiner

*Primary Examiner* — Than Nguyen
(74) *Attorney, Agent, or Firm* — Blakely, Sokoloff, Taylor & Zafman LLP

(57) ABSTRACT

A network element that includes multiple memory types and memory sizes translates a logical memory address into a physical memory address. A memory access request is received for a data structure with a logical memory address that includes a region identifier that identifies a region that is mapped to one or more memories and is associated with a set of one or more region attributes whose values are based on processing requirements provided by a software programmer and the available memories of the network element. The network element accesses the region mapping table entry corresponding to the region identifier and, using the region attributes that are associated with the region, determines an access target for the request, determines a physical memory address offset within the access target, and generates a physical memory address. The access target includes a target class of memory, an instance within the class of memory, and a particular physical address space of the instance within the class of memory. The physical memory address includes a network routing information portion that includes information to route the physical memory address to the target instance, and includes an address payload portion that includes information to identify the physical address space identified by the subtarget and the physical memory address offset.

19 Claims, 6 Drawing Sheets

EXPLICITLY REGIONED MEMORY ORGANIZATION IN A NETWORK ELEMENT

FIELD

Embodiments of the invention relate to the field of network elements; and more specifically, to an explicitly regioned memory organization in a network element.

BACKGROUND

Many microprocessor systems include memory management hardware to provide protection, isolation, and abstraction between software and physical memory. One typical addressing scheme includes the use of virtual memory that require dividing physical memory into a number of fixed size page frames and mapping virtual pages into those pages through a page mapping table. Different types and/or sizes of pages may be provided. To increase the speed of the translation process, microprocessors typically keep a cache of recently translated pages in a translation lookaside buffer (TLB).

Another type of memory management is segmentation which supports a number of segments of configurable size and start address. Segmentation is typically implemented via the use of segment registers implicitly specified in the instruction, which contains an index into a segment mapping table in memory that contains a segment descriptor. Segment descriptor caches have been developed to accelerate the translation process. There is a small number of segment registers that hold the actual contents of a few entries of the segment mapping table.

Although existing solutions solve the basic problem of mapping from a virtual to a physical address space and providing per page protection (or per segment protection in case of segmentation), they require high speed local lookup tables to provide a rapid address translation. These tables are relatively complex to manage since they are a form of caches of larger structures and are typically implemented as associative structures that have significant area and power costs associated with them. In addition, in the case of segmentation, since there is a small number of segment registers, using more than several segments is cumbersome as it requires an expensive segment register load.

SUMMARY

A network element that includes multiple memory types and memory sizes translates a logical memory address into a physical memory address. A memory access request is received for a data structure with a logical memory address that includes a region identifier that identifies a region that is mapped to one or more memories and is associated with a set of one or more region attributes whose values are based on processing requirements provided by a software programmer and the available memories of the network element. The network element accesses the region mapping table entry corresponding to the region identifier and, using the region attributes that are associated with the region, determines an access target for the request, determines a physical memory address offset within the access target, and generates a physical memory address. The access target includes a target class of memory, an instance within the class of memory, and a particular physical address space of the instance within the class of memory. The physical memory address includes a network routing information portion that includes information to route the physical memory address to the target instance, and includes an address payload portion that includes information to identify the physical address space identified by the subtarget and the physical memory address offset.

In one embodiment, a line card in a network element includes multiple physical memories, including memories of different types and sizes, and a cluster switch block that is configured to translate logical memory addresses into physical memory addresses based on information in a region mapping table. Each logical memory address includes a region identifier and a region offset. The region identifier identifies an entry of the region mapping table corresponding to a logical region of memory that is mapped to one or more of the plurality of physical memories. Each entry in the region mapping table indicates multiple region attributes for a region that are indicated based on a defined set of one or more processing requirements for each of the regions and the physical memories. The region attributes for each region indicate a size of that region, which one of the plurality of physical memories to use, and an offset into that physical memory.

In one embodiment, a region mapping table is built for use in line card for translating logical memory addresses into physical memory addresses, where the line card includes multiple physical memories of different types and sizes. Source code, which includes definitions for multiple data structures that are each associated with a region identifier and one or more processing requirements for a region corresponding to that region identifier, is compiled to produce object code. The object code is analyzed to determine the regions and their associated processing requirements. Based on those processing requirements and the availability of the physical memories of the line card, the regions are mapped among the physical memories such that the processing requirements associated with each of the regions will be met, including creating an entry for each different region in the region mapping table. Each entry includes region attributes that are used to translate a logical memory address having a region identifier belonging to that region and an offset into that region into a physical memory address. The region mapping table and the object code is stored on the line card.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
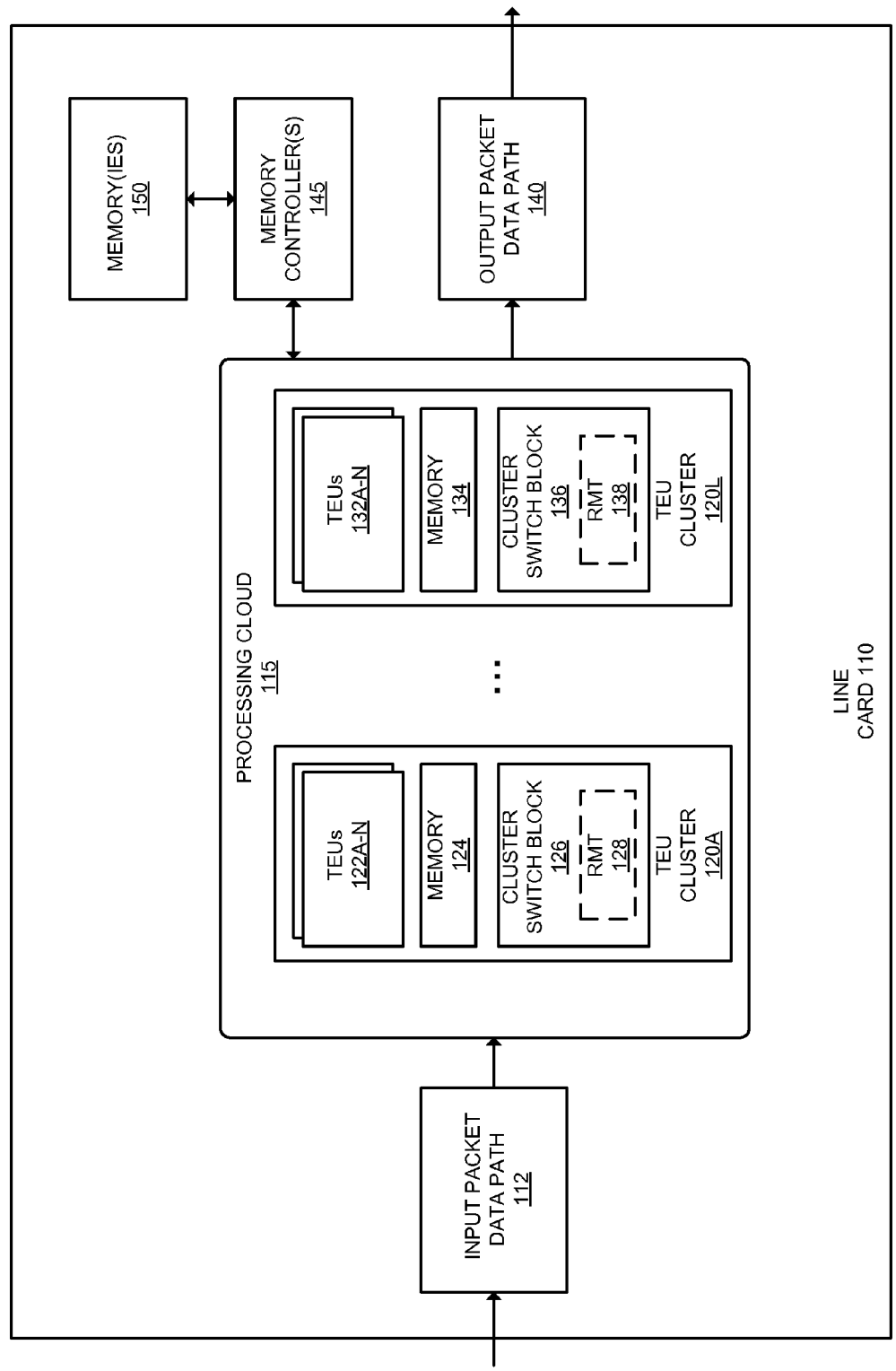
FIG. 1 is an exemplary line card that includes functionality to support an explicitly regioned memory organization according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for providing an explicitly regioned memory organization in a network processor to provide a flexible memory addressing scheme is described. In one embodiment, the logical memory address (used by the programmer when developing software) explicitly specifies both a selector and the offset into the selector. The selector includes a region identifier (region ID) field that is used as a direct index into a region mapping table (RMT) to directly index all the mapped regions. The RMT includes the information used to translate logical addresses into physical addresses. For example, the RMT includes region attributes that are used to translate logical addresses into physical addresses. For each region, the RMT includes region attributes such as one or more of the following: the region size, the specific physical memory to use and the offset into the physical memory, protection attributes, whether the region is striped across multiple physical memories (and if so the how many physical memories and the type of striping scheme), whether the region has hashing enabled, and what network to use to send the request to the memory.

In one embodiment, for various data structures, a software programmer(s) specifies the region to use for that data structure (e.g., a region ID assigned to that data structure) and processing requirements for that region (e.g., how large the region needs to be (the capacity) and how many accesses it needs to be able to support per packet (the bandwidth)). Based on the information provided by the software programmer and the available memories, one or more RMTs are created that map the regions to the available memories in such a way that it will meet the requirements for the regions (or at least be the best fit for the requirements), including defining values of the region attributes for the regions.

The explicitly regioned memory organization provides an abstraction between the software code and the specific hardware implementation and underlying memory technology. For example, the same code can be used for a relatively low performance implementation with a few physical channels of relatively slow memory, and used for a higher performance implementation with numerous physical channels of higher performance memory. By way of a specific example, a network element that includes multiple cards (e.g., one or more control cards, one or more line cards, and one or more feature cards) that each has one or more channels, chips, memories, etc., may use the explicitly regioned memory organization to selectively distribute the code across the different card(s), channel(s), chip(s), etc.

FIG. 1 is an exemplary line card 110 that includes functionality for an explicitly regioned memory organization in one embodiment. The exemplary line card 110 includes the input packet data path 112, the processing cloud 115, the output packet data path 140, and the memory controller(s) 145. The line card 110 includes a variety of physical memory spaces that are addressable. For example, the memory controller(s) 145 support multiple channels of memory of the one or more memories 150. For example, the one or more memories 150 can include one or more DDR3 SDRAMs (double-data-rate three synchronous dynamic random access memory), QDR DRAMs, (quad data rate dynamic random access memory) and/or RLDRAMs (reduced-latency dynamic random access memory) (or other suitable memory). The memory controller(s) 145 may also include local memory (e.g., eDRAM (embedded DRAM), SRAM (static random access memory), etc.). In one embodiment the memory controller(s) 145 are external to the chip while in other embodiments one or more of them are implemented on chip.

In one embodiment, the line card 110 is one line card of multiple line cards of a network element. As used herein, a network element (e.g., a router, switch, bridge) is a piece of networking equipment, including hardware and software, that communicatively interconnects other equipment on the network (e.g., other network elements, end stations). Typically, a network element also includes a set of one or more control cards and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane and are responsible for forwarding data (e.g., packets), while the set of control cards provide functionality for the control plane to determine how data (e.g., packets) is to be forwarded. For example, each line card may include forwarding data structure(s), access control list data structure(s), and other data structure(s) to process and store packet data.

The input packet data path 112 is a collection of hardware components that perform pre-processing of packets. For example, the input packet data path 112 may receive packets, perform pre-classification, determine whether the packets should be stored on chip or off chip, and/or issue the packet to a global job queue (which may be assigned to one of the threads in the processing cloud 115 for execution). The input packet data path 112 is coupled with the processing cloud 115.

The processing cloud 115 is responsible for performing the various lookups (e.g., forwarding table lookups) for packets. The processing cloud 115 includes a number of thread execution unit (TEU) clusters 120A-L, which each have multiple TEUs, local TEU memory, and a cluster switch block (CSB). For example, the TEU cluster 120A includes the TEUs 122A-N, the local TEU memory 124, and the CSB 126 (which implements the region mapping table (RMT) 128). The TEU cluster 120L includes the TEUs 132A-N, the local TEU memory 134, and the CSB 136 (which implements the RMT 138). The local TEU memories 124 and 134 may include eDRAM, SRAM, and/or L1 instruction cache. Thus, the line card 110 includes a variety of memory types (both on and off chip). It should be understood that different memory types have different characteristics (e.g., size, speed, latency, etc.).

Although not illustrated in FIG. 1 for simplicity purposes, the processing cloud 115 may also interface with one or more hardware accelerators to increase the speed at which packets are processed by reducing the number of instructions required for each packet, reducing data locking, and minimizing data movement. By way of example, the one or more hardware accelerators can include a hardware search and lookup engine, a hardware policer, and a hardware preclassifer.

When the processing cloud 115 is finished processing the packet, it pushes the packet descriptor to a re-order block (to support out-of-order packet processing) and then it is put onto the output packet data path 140. The output packet data path 140 includes a hardware traffic manager (HTM) and ultimately sends the packet out on the line through an outgoing interface of the line card 110.

A TEU is a multi-threaded processor core that processes a number of threads. In one embodiment, each TEU processes multiple threads (e.g., 16 threads) organized into thread groups (e.g., 4 thread groups) where at a given time, only a single thread in each thread group can be active and eligible for execution and the other threads in the thread groups are inactive (not eligible for execution). An active thread switch (switching from inactive to active) may be triggered by detection of an external memory read instruction or through an explicit active thread switch instruction. In one embodiment, a TEU has a kernel mode and a user mode. In one embodiment kernel mode allows use of absolute memory addresses while user mode requires the use of logical memory addresses.

A CSB is a logic block that connects each of the TEUs in its TEU cluster and the interconnect networks. For example, each CSB connects the TEUs in its TEU cluster to an on-chip network (OCN), which is primarily used for TEU to CSB communication (including accessing the local TEU memory and remote TEU memory) and TEU to memory controller(s) 145 communication, and to a data path network (DPN) that is primarily used for connecting the input packet data path 112 and output packet data path 140 to the CSBs and the memory controller(s) 145.

Each CSB also implements a RMT (region mapping table). The RMT is a table that contains information needed to translate logical memory addresses that explicitly include a region identifier and a region offset into physical memory addresses for the different memory spaces of the line card 110. Thus, for each TEU cluster, there is at least one RMT. In one embodiment, the RMTs in the processing cloud 115 include the same information (e.g., the RMT 28 and the RMT 38 include the same information), while in other embodiments at least some of the RMTs in the processing cloud 115 include different information. The RMT is used when a TEU cluster or CSB receives an external memory request. Details regarding generating the RMT will be described in greater detail later herein.

Thus, the line card 110 includes a variety of physical memory spaces that are addressable (e.g., local TEU memory, remote TEU memory, and one or more memory controllers that support multiple channels of off chip memory (e.g., DDR DRAM(s), RLDRAM(s), etc.)). These different types of memory spaces have different characteristics (size, bandwidth, latency, etc.). The memories may be logically separated into regions, which are defined by the RMTs (e.g., each different region has a different entry in an RMT). The regions may be mapped to one or more (via striping) physical memory spaces (of the same class) and has various properties associated with it that are specified in the RMT. The regions are identified with a region identifier (region ID). The region ID identifies a logically contiguous segment of memory of a given size.

The logical addressing scheme described herein allows software programmers to abstract their software code from the specific hardware implementation and underlying memory technology of the line card 110 (and other line cards in the network element). As a result, the same code can be used for a relatively low performance implementation with a few physical channels of relatively slow memory, and used for a higher performance implementation with numerous physical channels of higher performance memory. In addition, the same code can be used when line cards are replaced or upgraded with different hardware implementation and underlying memory technology.

Figure 2:
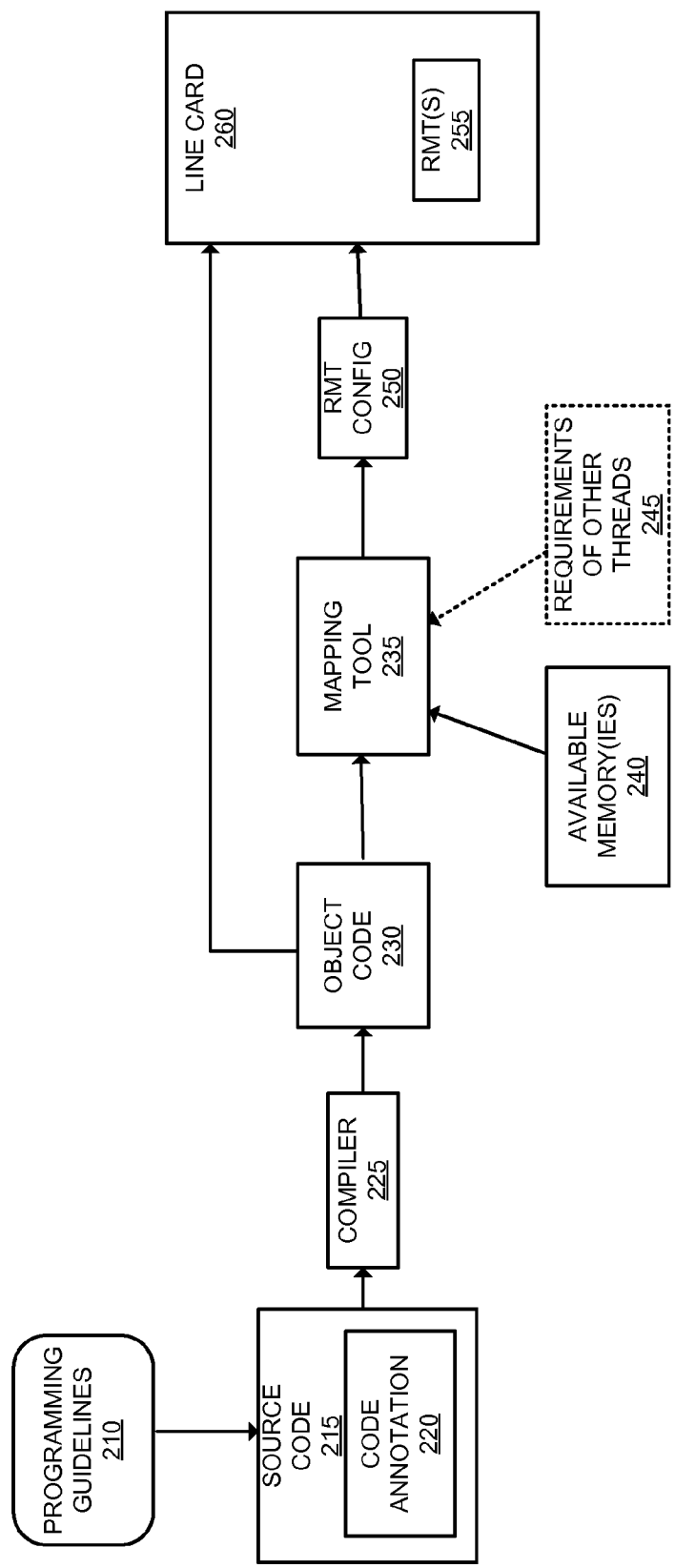
FIG. 2 illustrates a conceptual view of an exemplary technique for generating an explicitly regioned memory organization according to one embodiment.
Figure 3:
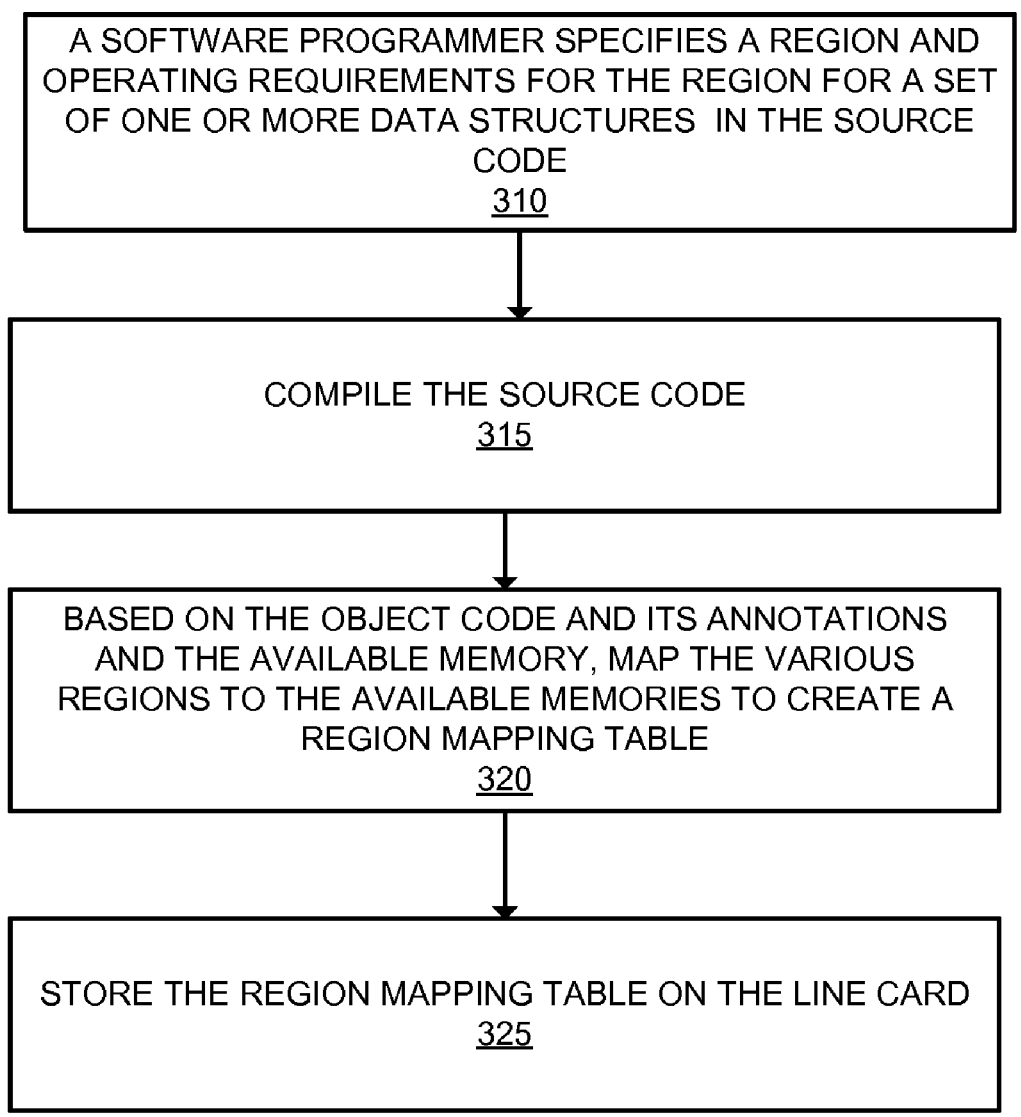
FIG. 3 is a flow diagram illustrating exemplary operations for generating an explicitly regioned memory organization according to one embodiment.

FIG. 2 illustrates a conceptual view of an exemplary technique for generating the explicitly regioned memory organization according to one embodiment. FIG. 2 will be described with reference to the exemplary operations of FIG. 3. However, it should be understood that the operations of FIG. 3 can be performed by embodiments other than those discussed with reference to FIG. 2, and the embodiments discussed with reference to FIG. 2 can perform operations different than those discussed with reference to FIG. 3.

At operation 310, a software programmer annotates the source code 215 (indicated by the code annotation 220) to specify a region (e.g., through a region ID) to use and processing requirements for the region (e.g., capacity and bandwidth) (collectively known as a region specification) for one or more data structures defined in the source code 215. The data structures assigned to the region can be any data structure programmed for use on the network element (e.g., a forwarding table, an access control list data structure, data structure(s) to store packet data, or other data structures programmed for use on the network element). In one embodiment, the region processing requirements specify the size of the region and the bandwidth of the region (how many accesses it needs to support per packet). The software programmer annotates the region specifications on a number of data structures of the source code 215. Flow moves from operation 310 to operation 315.

In one embodiment, the software programmer uses the programming guidelines 210 when annotating the source code 215. The programming guidelines 210 indicate a suggested region usage for different data structures. For example, the programming guidelines 210 may indicate that a first level of a forwarding table should be assigned to a specific region and have a relatively small amount of latency (e.g., this region may be placed in on-chip memory). It should be understood that although the programming guidelines 210 provide guidance to the software programmers in relation to region usage for certain data structures, this guidance does not necessarily need to be followed.

Sometime after the source code 215 is annotated with the region specification(s), at operation 315 it is compiled by the compiler 225 to produce the object code 230. Flow then moves from operation 315 to operation 320.

At operation 320, the mapping tool 235 uses the object code 230, the list of available memory(ies) 240 (for the line card 260), and optionally the requirements of other threads 245 to generate a mapping of the various regions to the available memories. The list of available memory(ies) 240 can also indicate, for each line card, the specification of the memories (e.g., the number of channels of RLDRAM, the capacity of DDR memory, etc.). In one embodiment, the mapping tool 235 generates entries of a region mapping table based on the region processing requirements annotated in the code and the available memories. In one embodiment the mapping tool 235 is an automated tool that scans the code to determine the regions used and their associated requirements and map those regions to the available memories in such a way that it will meet the requirements (e.g., capacity and bandwidth) provided by the software program in the annotated code. In another embodiment, the mapping tool 235 is a manual tool used by an operator to designate the regions of the memories in such a way that it will meet the requirements (e.g., capacity and bandwidth) of the software.

In one embodiment, if the mapping cannot meet a requirement for a data structure, the mapping tool 235 provides an error message accordingly thereby alerting the software developer of the error (the software developer may then make a change in the region assignments as necessary). In another embodiment, the mapping tool 235 provides a best fit mapping such that most or all of the requirements are met while also providing a log of the mapping that indicates any variances between the mapping and the requirements.

The mapping tool 235 generates the RMT configuration file 250 which indicates how the RMT(s) 255 of the line card 260 are to be populated and thus how the regions are to be configured on the different memory spaces. Flow moves to operation 325 and one or more region mapping table(s) 255 are stored on the line card 260. In addition, the image (the object code 230) is loaded onto the line card 260.

The mapping tool 235 and the resultant RMT allows the person writing the code to not need to designate space on a specific memory (e.g., the EDRAM on the chip) and determine whether it has enough space. Instead, the software programmer only specifies a region and region requirements and the mapping (e.g., provided by application of the mapping tool 235) procedure maps the regions to the available memories in a manner that automatically satisfies the requirements. Thus, the mapping is performed independently of the software development. As a result, the software is largely abstracted from the specifics of the memories supported on a given hardware implementation, thereby reducing the software development complexity. For example, software development in context of a network element, where it is typical to have different types and sizes of physical memories in order to achieve high bandwidth packet processing, is simplified as the software developer does not need to know (and often times may not know) the specific physical memory implementation of the network element. This also promotes code reuse as the same code can be used for different implementations. For example, the same code can be used for a relatively low performance implementation (e.g., with a few physical channels of relatively slow memory) and used for a higher performance implementation (e.g., with numerous physical channels of higher performance memory). As another example, as the hardware implementation of a network element changes (e.g., different line cards are installed, upgraded, and/or removed), the same code can be used as input into the mapping procedure to map the regions to the available memories to support the given requirements.

Figure 4:
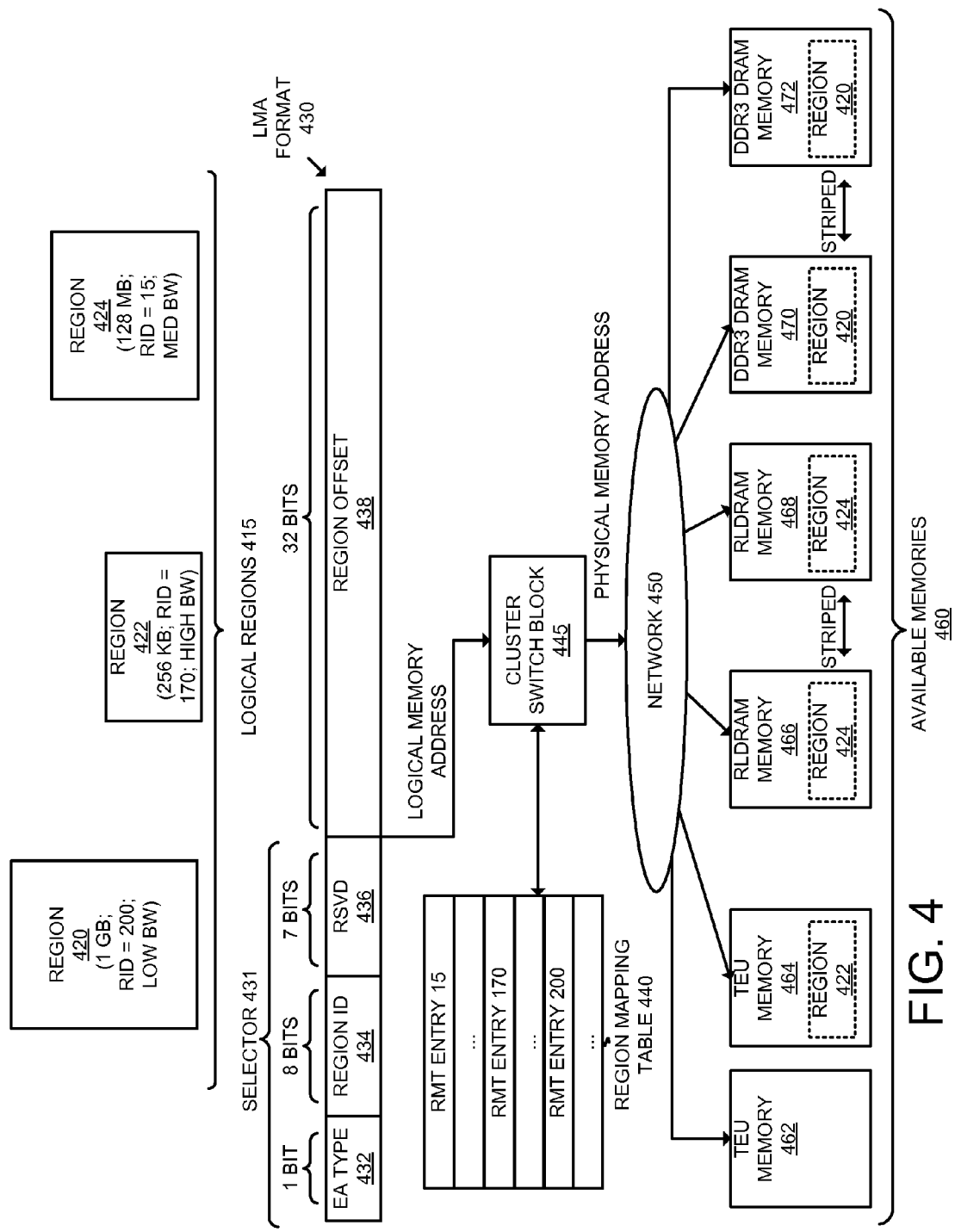
FIG. 4 illustrates an example of an explicitly regioned memory organization according to one embodiment.

FIG. 4 illustrates an example of an explicitly regioned memory organization according to one embodiment. As illustrated in FIG. 4, the logical regions 415 includes a number of regions. Specifically, the logical regions 415 includes the regions 420, 422, and 424. The region 420 has been specified as being 1 GB in size, having the region ID 200, and requiring a relatively low amount of bandwidth. By way of example, the data structure associated with the region 420 is used for packet data. The region 422 has been specified as being 256 KB in size, having the region ID 170, and requiring a relatively high amount of bandwidth. By way of example, the data structure associated with the region 422 is part of a forwarding table data structure. The region 424 has been specified as being 128 MB in size, having the region ID 15, and requiring a relatively medium amount of bandwidth. By way of example, the data structure associated with the region 424 is an access control list data structure. In one embodiment, the region specifications have been provided by a software programmer at the source code level.

The region specifications, along with the available memories, will be used to create the RMT 440. As illustrated in the example in FIG. 4, the available memories 460 include the local TEU memories 462 and 464, the off-chip RLDRAMs 466 and 468, and the off-chip DDR3 DRAMs 470 and 472. It should be understood that the local TEU memories 462 and 464 (which can be implemented in eDRAM, SRAM, or other suitable on-chip memory) is typically faster to access than the off-chip memories 466, 468, 470, and 472, but is also smaller than those off-chip memories. In addition, the off-chip memories 466 and 468 provide faster access rates than the off-chip memories 470 and 472 but they also are smaller in size than the off-chip memories 470 and 472. As illustrated in FIG. 4, the region 422 identified by the region ID 170 is mapped to the local TEU memory 464, the region 424 is mapped to the off-chip memories 466 and 468 (e.g., the region is striped across the off-chip memories 466 and 468), and the region 420 is mapped to the off-chip memories 470 and 472 (the region is striped across the off-chip memories 470 and 472). Thus, the forwarding table data structure associated with the region 422 is located in the local TEU memory 464, which has a relatively high amount of bandwidth, the access control list data structure associated with the region 424 is striped across the off-chip memories 466 and 468, which have a relatively medium amount of bandwidth and size, and the packet data structure(s) associated with the region 420 is striped across the off-chip memories 470 and 472, which have a relatively small amount of bandwidth and a relatively large size. Although FIG. 4 illustrates particular types of memories (DDR3 DRAMs, RLDRAMs), it should be understood that these types are for exemplary purposes and different types of memories can be used in embodiments.

In one embodiment, software uses a logical memory address to access the data structures stored in the memories 460. A logical memory address is translated by the cluster switch block 445 into a physical memory address (e.g., in order to access the data structures stored in the memories 460). FIG. 4 illustrates an exemplary logical address format 430, which includes the selector 431 and the region offset 438. The selector 431 includes the type field 432, the region ID field 434, and the reserved filed 436. The type field 432 indicates the type of memory address and can be used to indicate a logical memory address or an absolute memory address. An absolute memory address contains the same information as a physical address and it allows the RMT to be bypassed and any physical memory or register space to be directly addressed. For the purposes of this example, a logical memory address is used. In addition, software typically uses the logical memory addresses when accessing memory, and the selector is explicitly specified (unlike other segmentation schemes where the selector is implicitly specified by an instruction). The region ID field 434 provides the region ID that identifies one of the regions in the RMT table 440. The reserved field 436 is optional and is used for future expansion. The offset 438 indicates the offset into the region.

The cluster switch block 445 translates the logical memory address into a physical memory address. The cluster switch block 445 uses the region ID in the region ID field 434 of the logical memory address as an index into the RMT table 440 to locate the corresponding RMT entry. For example, if the region ID is 200, the RMT entry 200 is accessed. Each RMT entry includes information to translate the logical memory address into a physical memory address including the specific physical memory to use and the network 450 to use to access that specific physical memory (OCN or DPN). The RMT entry may also indicate whether striping is used (and what kind of striping), whether hashing is to be used to determine which specific physical memory, channel, and/or bank of memory an address should map to, one or more protection attributes (e.g., whether and what type of error correcting code (ECC) is used, whether the region is to be cached in the memory controller cache, whether read access is allowed from kernel mode, whether write access is allowed from kernel mode, whether execute access is allowed from kernel mode, whether read access is allowed from user mode, whether write access is allowed from user mode, and whether execute access is allowed from user mode).

Based on the information in the RMT entry and the value of the region offset field 438, the cluster switch block 445 determines the physical memory address at the specific memory and causes the memory to be accessed over the proper network.

Figure 5:
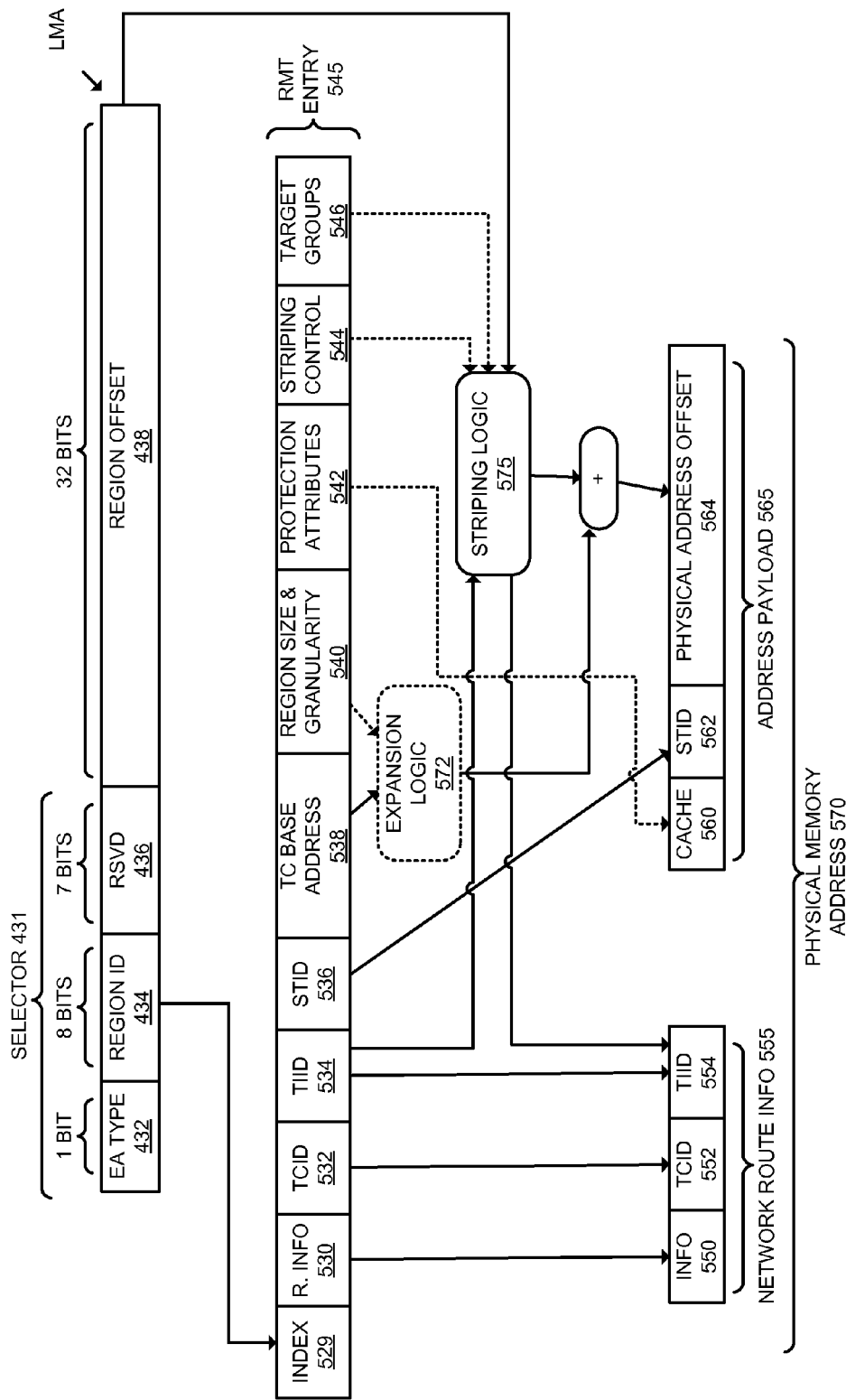
FIG. 5 illustrates a exemplary logical memory address to physical memory address translation in an explicitly regioned memory organization according to one embodiment.

FIG. 5 illustrates a more detailed view of an exemplary logical memory address to physical memory address translation in an explicitly regioned memory organization according to one embodiment. In one embodiment, the physical memory address 570 includes a network route information 555 portion and an address payload 565 portion. The network route information 555 is used to route the address to a target and includes a target identifier represented by the target class ID field 552 and the target instance ID field 554 and associated routing attributes that indicate what network to use (stored in the routing information field 550). The address payload 565 portion includes a subtarget ID stored in the subtarget ID field 562 that uniquely identifies a register or memory space within a target and a physical address offset 564 within the physical space. The address payload 565 may also indicate whether the region is cacheable (e.g., indicated in the cacheablity field 560).

In one embodiment, a cluster switch block (e.g., one of the cluster switch blocks of the TEU clusters 120A-120L) performs the logical memory address to physical memory address translation. The logical memory address to physical memory address translation includes using the region ID associated with the logical memory address to select the appropriate region (indexed into the region mapping table) and adding the region base address to the region offset to form a linear address within a target class. The access target (e.g., the specific memory) is then determined. In one embodiment, the access target includes a target class ID and a target instance ID. The target class ID is programmed per region and is typically included in an entry in the RMT. The target instance ID is typically determined based on a particular striping method (e.g., power-of-two or non-power-of-two striping).

In one embodiment, in the case of power-of-two striping, one to four bits (depending on how many ways of striping (e.g., as indicated in a striping control field of the RMT entry)) of the linear address are used as striping bits to determine the appropriate target instance ID. Those bits that are selected are moved out from the linear address (they become part of the network route information) and any higher order linear address bits are shifted right to fill in the hole. The result is then added to the target class base address to form the physical address offset within the selected target.

In one embodiment, the case of non-power-of-two striping is fundamentally 3 or 5 based. For example, the non-power-of-two striping can be 3-way, 5-way, 6-way, 10-way, or 12-way. Assuming such a non-power-of-two striping scheme, the determination of the target instance ID is based on a mod 3 or mode 5 function of the linear address and may include some of the striping bits in the case of 6, 10, or 12 way striping. For example, in the case of 6-way, 10-way, or 12-way striping, some of the quotient bits are moved out of the quotient and are used as striping bits. The high order bits are shifted down to fill the hole, and the result is then added to the target class base address to form the physical address offset within the selected target.

As illustrated in FIG. 5, the region ID in the region ID field 434 of the linear memory address is used to index the RMT entry 545. The RMT entry includes the index 529, the routing info field 530, the target class ID (TCID) field 532, the target instance ID (TIID) field 534, the sub-target ID (STID) field 536, the target class base address field 538, the region size and granularity field 540, the protection attributes field 542, the striping control field 544, and the target groups field 546.

The routing information field 530 specifies which network and physical channel is used to access the target (in situations where the network has multiple channels, such as the OCN). In one embodiment and as illustrated in FIG. 5, the value in the routing information field 530 is used in the routing information field 550 of the network route information 555 of the physical memory address 570. The target class ID (TCID) field 532 is used to identify the target class of memory. In one embodiment, the target class can be a TEU cluster (TEC), a memory controller, and a hardware traffic manager. In one embodiment and as illustrated in FIG. 5, the value of the TCID field 532 is used as the value in the TCID field 552 of the network route information 555.

The target instance ID (TIID) field is used to identify a specific instance within the target class. In one embodiment, the TIID is programmed into the RMT entry, while in other embodiments it is generated (e.g., by the cluster switch block) based on the type of striping that may be used. For example, in the case of power-of-two striping, one to four bits (depending on how many ways of striping (e.g., as indicated in a striping control field of the RMT entry)) of the linear address are used as striping bits to determine the appropriate TIID. In the case of non-power-of-two striping, in one embodiment the determination of the target instance ID is based on a mod 3 or mode 5 function of the linear address and may include some of the striping bits in the case of 6, 10, or 12 way striping. For example, in the case of 6-way, 10-way, or 12-way striping, some of the quotient bits are moved out of the quotient and are used as striping bits.

In one embodiment and as illustrated in FIG. 5, the TIID is used in the TIID field 554 of the network route information 555.

The subtarget ID (STID) field 536 uniquely identifies a subtarget (the particular memory) (e.g., eDRAM, SRAM, DDR3 DRAM, RLDRAM) or register block of the primary target (e.g., TEU cluster, memory controller, hardware traffic manager). The available subtargets may be different depending on the primary target. For example, at a TEU cluster, the available subtargets may include a register subtarget (which corresponds to the register(s) and/or work queue(s) located at the CSB of that TEU cluster as well as the register spaces for the TEUs of the TEU cluster) and local EDRAM subtarget. As another example, the available subtargets at a memory controller may include a memory controller register subtarget, a memory controller EDRAM subtarget, and a memory controller DRAM subtarget to allow access to the configuration register(s), local SRAM, and off-chip DRAM respectively. Thus, the target ID (including the target class ID and the target instance ID) allows the address to be routed to a target (e.g., TEU cluster, memory controller, hardware traffic manager), and the subtarget ID allows the address to be routed to a specific register or memory space within that target. In one embodiment and as illustrated in FIG. 5, the value in the sub target ID field 536 is used in the sub target ID field 562 in the address payload 565 of the physical memory address 570.

The target class base address 538 indicates the physical base address within a target instance for the region. The target class base address is a starting physical address offset in a single target instance memory space. The region size and granularity field 540 specifies the region block size and the total size of the region in units of region block size. For example, the region size can be 16 KB-64 MB with a 16 KB region block size. As another example, the region size can be 1 MB-4 GB with a 1 MB region block size. In one embodiment, the target class base address 548 is expanded to a 32 bit value by the 32 bit expansion logic 572.

The protection attributes field 542 specifies one or more protection attributes for the region. For example, the protection attributes field 542 can specify one or more of: whether and what type of ECC is used (e.g., no ECC, extra-burst ECC, 28/4 ECC), whether the region is to be cached in the memory controller cache, whether read access is allowed from kernel mode, whether write access is allowed from kernel mode, whether execute access is allowed from kernel mode, whether read access is allowed from user mode, whether write access is allowed from user mode, and whether execute access is allowed from user mode. In one embodiment, the cacheability protection attribute (whether the region is to be cached in the memory controller cache) is used in the cacheability field 560 of the address payload 565 of the physical memory address 570.

In one embodiment, the access protection bits per region (KernelRead, KernelWrite, KernelExecute, UserRead, UserWrite, and/or UserExecute) allow for the current operation (one of read, write, and execute) and operating mode (one of kernel mode and user mode of the TEU processing the operation) to be checked against the allowed access and cause a debug protection violation trap to be taken if access is denied. Thus different logical regions of memory can be protected against unintended writes, for example. The same protection applies to all threads sharing a region mapping table. This allows the software developers to assign different data structures to different regions with different types of protection. In addition, for accesses that exceed the bounds of a region or that are denied due to access type are detected and trapped.

The striping control field 544 specifies the number of target instances in the striping group (e.g., 1-6 instances, 8 instances, 10 instances, 12 instances, 16 instances). The target groups field 546 specifies the instances in the target group depending on the type of striping that is being used.

The striping logic 575 performs striping (if striping is configured as indicated in the striping control field 544). The striping logic 575 uses the logical memory address when performing striping. For example, the striping logic 575 determines which bits of the linear address are to be used as striping bits to select the appropriate target instance within the target class. Multiple types of striping are supported (e.g., 1-way to 6-way, 8-way, 10-way, 12-way, 16-way). Striping includes selecting one of the target groups (as indicated by the target groups field 546) for the region (and potentially modifying its least significant bit in case of 8, 10, or 12 way striping). The striping logic 575 determines the target instance ID (which is stored in the target instance ID field 554 of the network route information 555) based on a particular striping method (e.g., power-of-two or non-power-of-two striping) configured for the region and selects one of the target groups for the memory access. In one embodiment, in the case of power-of-two striping, the striping logic 575 uses one to four bits (depending on how many ways of striping (e.g., as indicated in a striping control field of the RMT entry)) of the linear address as striping bits to determine the appropriate target instance ID. Those bits that are selected are moved out from the linear address (they become part of the network route information in the TIID field 554) and any higher order linear address bits are shifted right to fill in the hole. The target class base address provided in the target class base address field 538 (which may be expanded to a 32 bit value by the expansion logic 572) is then added to the result to form the physical address offset 564 within the selected target. In one embodiment, in the case of non-power-of-two striping, the striping logic 575 determines the target instance ID based on a mod 3 or mode 5 function of the linear address and may include one or more of the striping bits in the case of 6, 10, or 12 way striping. For example, in the case of 6-way, 10-way, or 12-way striping, some of the quotient bits are moved out of the quotient and are used as striping bits. The high order bits are shifted down to fill the hole, and the result is then added to the target class base address to form the physical address offset within the selected target.

In one embodiment, hashing may also be used to determine which target instance, channel, and/or bank of memory an address should map to. In one embodiment, the region mapping table includes a hash enable field that indicates, for a given region, whether a hash function should be used to determine which target instance, channel, and/or bank of memory an address should map to. If hash mode is enabled, the hashed address (or hashed quotient in the non-power-of-two striping case) is used when performing the striping.

In one embodiment, replication may be used such that writes to a region are automatically replicated to multiple memories, and a round robin arbiter (or other suitable arbiter) is used to determine where to send read requests. Whether a region is specified for replication may be indicated in the RMT entry for that region. In another embodiment, only read replication is performed and the software must be configured to explicitly perform writes in an non-replicated fashion using an alternate region mapping.

In one embodiment, attributes related to the memory are specified in the RMT on a per region basis and are transparent to the application software. For example, memory can be specified in the RMT as striped automatically across multiple targets, hashed, and/or replicated. In addition, the network that is used to access the memory can also be specified in the RMT and be transparent to the application software.

Figure 6:
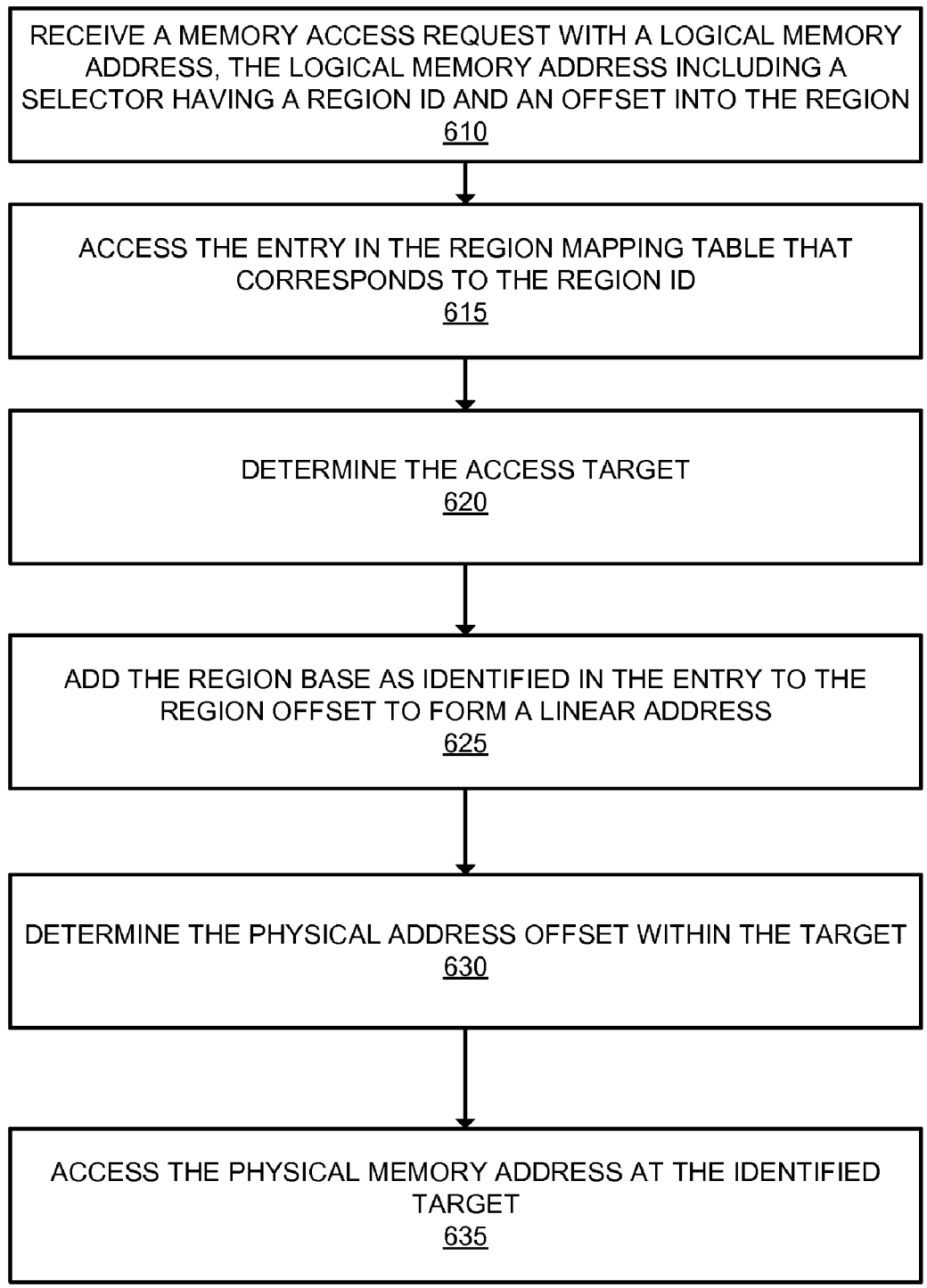
FIG. 6 is a flow diagram illustrating exemplary operations for translating a logical memory address to a physical memory address using an explicitly regioned memory organization according to one embodiment.

FIG. 6 is a flow diagram illustrating exemplary operations for translating a logical memory address to a physical memory address using an explicitly regioned memory organization according to one embodiment. It should be understood that at the time of the operations of FIG. 6, a region mapping table has been configured (either manually or through a region mapping tool). In one embodiment, the operations described in reference to FIG. 6 are performed by a CSB (e.g., such as the CSB 126).

At operation 610, the CSB receives a memory access request with a logical memory address. The logical memory address includes a selector (which may be specified by a programmer) having a region ID and an offset into the region. Flow then moves to operation 615 and the CSB accesses the entry in the region mapping table that corresponds to the region ID. For example, the entry may include similar information as described in reference to FIG. 5. Flow then moves to operation 620.

At operation 620, the CSB determines the access target. In one embodiment, the access target is identified by a target ID (composed of a target class ID and a target instance ID) and a subtarget ID. The target class ID is programmed per region and is typically included in the entry in the RMT. The target instance ID is typically determined based on a particular striping method (e.g., power-of-two or non-power-of-two striping), as previously described herein. The subtarget is also programmed per region and is typically included in the entry in the RMT. The target class ID and target instance ID are used as part of a network route information part of the physical memory address, and the subtarget ID is used as part of the address payload of the physical memory address. Flow then moves to operation 625 and the CSB adds the region base address as identified in the RMT entry to the region offset to form a linear address. Flow then moves to operation 630.

At operation 630 and the CSB determines the physical address offset within the access target. In one embodiment, the physical address offset depends at least in part on the type of striping that is being used. For example, in the case of power-of-two striping, the striping logic 575 selects one or more bits from the linear address (they become part of the network route information in the TIID field 554) and any higher order linear address bits are shifted right to fill in the hole. The target class base address provided in the target class base address field 538 (which may be expanded to a 32 bit value by the expansion logic 572) is then added to the result to form the physical address offset 564 within the selected target. As another example, in the case of non-power-of-two striping, the striping logic 575 determines the target instance ID based on a mod 3 or mode 5 function of the linear address and may include one or more of the striping bits in the case of 6, 10, or 12 way striping. For example, in the case of 6-way, 10-way, or 12-way striping, some of the quotient bits are moved out of the quotient and are used as striping bits. The high order bits are shifted down to fill the hole, and the result is then added to the target class base address to form the physical address offset within the selected target. Flow then moves to operation 635 and the physical memory address at the identified target is accessed.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a network element for translating a logical memory address into a physical memory address, the network element including a plurality of memory types and memory sizes, the method comprising the steps of:
   receiving a memory access request for a data structure with a logical memory address that includes a region identifier and an offset into the region, wherein the region identifier identifies a region that is mapped to one or more memories and is associated with a set of one or more region attributes whose values are based on one or more processing requirements provided by a software programmer and a set of one or more available memories of the network element;
   accessing a region mapping table entry corresponding to the region identifier in a region mapping table that identifies the set of region attributes that are associated with the region;
   performing the following steps using at least a portion of the set of region attributes:
      determining an access target for the memory access request including a target class that identifies a class of memory, a target instance that identifies an instance within the class of memory, and a subtarget that identifies a particular physical address space of the instance within the class of memory;
      determining a physical memory address offset within the determined access target; and
      generating a physical memory address that includes:
         a network routing information portion that includes information to route the physical memory address to the target instance, and
         an address payload portion that includes information to identify the physical address space identified by the subtarget and the physical memory address offset.

2. The method of claim 1, wherein the processing requirements include a size of the region and how many accesses that region needs to be able to support per packet.

3. The method of claim 1, wherein the set of region attributes indicates that the region is striped across a plurality of memories.

4. The method of claim 1, wherein the set of region attributes indicates that a hash function is to be used to determine the target instance.

5. The method of claim 1, wherein the set of region attributes includes one or more protection attributes.

6. The method of claim 1, further comprising the step of forming a linear memory address, wherein the step of forming the linear memory address includes adding a region base address that is identified in the region mapping table entry to the region offset; and wherein the step of determining the access target further includes the following steps:
accessing the region mapping table entry to determine the target class; and
identifying one or more bits of the linear memory address to identify the target instance.

7. The method of claim 1, wherein the target class is one of a thread execution unit (TEU) cluster that includes one or more TEUs and one or more local memories, a memory controller, and a hardware traffic manager.

8. A line card in a network element for translating a logical memory address into a physical memory address, the line card including:
a plurality of physical memories including memories of different types and sizes;
a cluster switch block configured to translate logical memory addresses into physical memory addresses based on information in a region mapping table, wherein each logical memory address includes:
a region identifier that identifies an entry of the region mapping table corresponding to a logical region of memory that is mapped to one or more of the plurality of physical memories, and
a region offset; and
wherein each entry in the region mapping table indicates a plurality of region attributes for a particular region that are indicated based on a defined set of one or more processing requirements for each of the regions and the plurality of physical memories, the plurality of region attributes for each region indicating a size of that region, which one of the plurality of physical memories to use, and an offset in that physical memory.

9. The line card of claim 8, wherein the one or more processing requirements for each region includes a size of the region and how many accesses that region needs to be able to support per packet.

10. The line card of claim 8, wherein the plurality of region attributes for each region further indicates whether that region is striped across multiple ones of the plurality of physical memories and what type of striping scheme is used.

11. The line card of claim 8, wherein the plurality of region attributes for each region further indicates whether the cluster switch block is to use hash function to determine which one of the plurality of physical memories to use.

12. The line card of claim 8, wherein the plurality of region attributes for each region further includes one or more protection attributes including one or more access protection bits to indicate one or more of: whether read access is allowed from kernel mode, whether write access is allowed from kernel mode, whether execute access is allowed from kernel mode, whether read access is allowed from user mode, whether write access is allowed from user mode, and whether execute access is allowed from user mode.

13. The line card of claim 8, wherein each physical memory address includes a network route information portion that includes information to route the physical memory address to the particular physical memory to use, and an address payload portion that includes information to identify one of a register or memory space within the physical memory address to use.

14. A method for building a region mapping table for use in a line card for translating logical memory addresses into physical memory addresses, the line card having a plurality of physical memories including memories of different types and sizes, the method comprising the steps of:
compiling source code to produce object code, the source code defining a plurality of data structures that are each associated with a region identifier and one or more processing requirements for a region corresponding with that region identifier;
analyzing the object code to determine the plurality of regions and their associated processing requirements;
based on the processing requirements associated with the plurality of regions and availability of the plurality of physical memories of the line card, mapping the plurality of regions among the plurality of physical memories such that the processing requirements associated with each of the plurality of regions will be met, wherein mapping includes creating an entry for each different region in the region mapping table, wherein each entry includes a plurality of region attributes that are used to translate a logical memory address having a region identifier belonging to that region and an offset into that region into a physical memory address; and
storing the region mapping table and the object code on the line card.

15. The method of claim 14, wherein the one or more processing requirements for each of the regions includes a size of the region and how many accesses that region needs to be able to support per packet.

16. The method of claim 14, wherein for each entry in the region mapping table, the plurality of region attributes for that entry indicate which one of the physical memories to use, an offset into that physical memory, and one or more protection attributes.

17. The method of claim 16, wherein for each entry in the region mapping table, the plurality of region attributes further indicate whether the region corresponding to that entry is striped across multiple ones of the plurality of physical memories and what type of striping scheme is used.

18. The method of claim 16, wherein for each entry in the region mapping table, the plurality of region attributes further indicate whether a hash function is to be used to determine which one of the plurality of physical memories to use.

19. The method of claim 16, wherein for each entry in the region mapping table, the one or more protection attributes includes one or more access protection bits to indicate one or more of: whether read access is allowed from kernel mode, whether write access is allowed from kernel mode, whether execute access is allowed from kernel mode, whether read access is allowed from user mode, whether write access is allowed from user mode, and whether execute access is allowed from user mode.

* * * * *

UNITED STATES PATENT AND TRADEMARK OFFICE
CERTIFICATE OF CORRECTION

| | |
|---|---|
| PATENT NO. | : 8,402,248 B2 |
| APPLICATION NO. | : 12/983130 |
| DATED | : March 19, 2013 |
| INVENTOR(S) | : Meier et al. |

Page 1 of 1

It is certified that error appears in the above-identified patent and that said Letters Patent is hereby corrected as shown below:

On the Title Page, in Item [74], under "Attorney, Agent or Firm", in Column 2, Line 1, delete "Blakely, Sokoloff, Taylor" and insert -- Blakely Sokoloff Taylor --, therefor.

In the Specifications
In Column 8, Line 49, delete "filed 436." and insert -- field 436. --, therefor.

Signed and Sealed this
Fourth Day of February, 2014

Michelle K. Lee
*Deputy Director of the United States Patent and Trademark Office*